US011353698B1

(12) United States Patent
Sharma et al.

(10) Patent No.: US 11,353,698 B1
(45) Date of Patent: Jun. 7, 2022

(54) DUAL PURKINJE IMAGING WITH ELLIPSOIDAL LENSING STRUCTURE

(71) Applicant: Facebook Technologies, LLC, Menlo Park, CA (US)

(72) Inventors: Robin Sharma, Redmond, WA (US); Andrew John Ouderkirk, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 43 days.

(21) Appl. No.: 16/425,344

(22) Filed: May 29, 2019

(51) Int. Cl.
| *G02B 27/00* | (2006.01) |
| *H04N 5/33* | (2006.01) |
| *G02B 27/01* | (2006.01) |
| *H04N 5/225* | (2006.01) |
| *G06T 7/73* | (2017.01) |
| *G06T 7/00* | (2017.01) |
| *G02B 27/09* | (2006.01) |

(52) U.S. Cl.
CPC ..... *G02B 27/0093* (2013.01); *G02B 27/0172* (2013.01); *G02B 27/0983* (2013.01); *G06T 7/0012* (2013.01); *G06T 7/73* (2017.01); *H04N 5/2256* (2013.01); *H04N 5/33* (2013.01); *G02B 2027/0178* (2013.01); *G06T 2207/30041* (2013.01)

(58) Field of Classification Search
CPC ............ G02B 27/0093; G02B 27/0172; G02B 27/0983; G02B 2027/0178; G06T 7/73; G06T 7/0012; G06T 2207/30041; H04N 5/2256; H04N 5/33
See application file for complete search history.

(56) References Cited

U.S. PATENT DOCUMENTS

| 5,621,424 | A | 4/1997 | Shimada et al. |
| 5,815,741 | A | 9/1998 | Okuyama et al. |
| 6,449,309 | B1 | 9/2002 | Tabata |
| 2002/0030636 | A1 | 3/2002 | Richards |
| 2004/0080467 | A1 | 4/2004 | Chinthammit et al. |
| 2008/0291397 | A1 | 11/2008 | Tesar |
| 2009/0007937 | A1 | 1/2009 | Chen et al. |
| 2010/0045933 | A1* | 2/2010 | Eberl ................. G02B 27/0172 351/210 |
| 2011/0075257 | A1 | 3/2011 | Hua et al. |
| 2012/0105310 | A1* | 5/2012 | Sverdrup ........... G02B 27/0172 345/8 |

(Continued)

FOREIGN PATENT DOCUMENTS

| EP | 1405123 B1 * | 3/2007 | ......... G06F 3/04815 |
| WO | WO-2018160146 A1 * | 9/2018 | ............. G06F 1/163 |

OTHER PUBLICATIONS

Jessica Morales. Purkinje Images. 2017 Tech Notes. Department of Electrical and Computer Engineering. Tufts 2017. (Year: 2017).*

(Continued)

*Primary Examiner* — Collin X Beatty
(74) *Attorney, Agent, or Firm* — Freestone Intellectual Property Law PLLC; Aaron J. Visbeek; William J. Pigott (57) ABSTRACT

An eye is illuminated with infrared illumination light. Illuminating the eye includes illuminating a near-eye ellipsoidal lensing structure. A tracking image of Purkinje reflections of the infrared illumination light is captured by a camera. An eye position of the eye is determined in response to the tracking image.

10 Claims, 11 Drawing Sheets

(56) References Cited

U.S. PATENT DOCUMENTS

| | | | |
|---|---|---|---|
| 2012/0257166 A1* | 10/2012 | Francis | G02B 21/0028 |
| | | | 351/208 |
| 2013/0314793 A1 | 11/2013 | Robbins et al. | |
| 2016/0091720 A1 | 3/2016 | Stafford et al. | |
| 2016/0187653 A1 | 6/2016 | Kimura | |
| 2016/0349514 A1* | 12/2016 | Alexander | G06F 3/013 |
| 2018/0084232 A1* | 3/2018 | Belenkii | H04N 13/324 |
| 2018/0232048 A1* | 8/2018 | Popovich | G02F 1/2955 |
| 2019/0179409 A1 | 6/2019 | Jones et al. | |
| 2019/0222830 A1* | 7/2019 | Edwin | G02B 27/0093 |
| 2019/0258062 A1* | 8/2019 | Aleem | G02B 26/12 |
| 2020/0183155 A1* | 6/2020 | Xie | G02B 27/0093 |

OTHER PUBLICATIONS

Deubel, Heiner, Fourth Purkinje Image Signal Reveal Eye-lens Deviations and Retinal Image Distortions During Saccades, 1996.
Chamberlain, Ann C., Dual Purkinje-lmage Eyetracker, Trident Scholar project report, No. 238, 1996.
Dual Purkinje Eyetrackers, Laboratory of Experimental Psychology.
Non-Final Office Action, U.S. Appl. No. 16/425,308, Notification Date: Nov. 17, 2020, 19 pages.

* cited by examiner

DUAL PURKINJE IMAGING WITH ELLIPSOIDAL LENSING STRUCTURE

TECHNICAL FIELD

This disclosure relates generally to optics and in particular to dual Purkinje imaging with an ellipsoidal lensing structure.

BACKGROUND INFORMATION

Named for the 19th century work of Czech anatomist Jan Evangelista Purkyně, Purkinje images are generated from reflections off the eye surfaces of the lens and cornea. Dual Purkinje images typically utilize the first Purkinje reflection off the outer surface of the cornea and the fourth Purkinje reflection off the inner surface of the lens of the eye. In 1985, Crane and Steel produced a Dual-Purkinje image tracker capable of measuring eye position during a saccade.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments for capturing Purkinje images with an ellipsoidal lensing structure are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The apparatus, system, and method for dual Purkinje imaging described in this disclosure utilize an ellipsoidal lensing structure to illuminate an eye with infrared light and captures Purkinje images of the infrared light reflected from the eye. The ellipsoidal lensing structure may be included in an optical combiner for a head mounted display (HMD) that passes visible display light or scene light to the eye while directing infrared Purkinje reflections to a camera. The ellipsoidal lensing structure may be selectively illuminated to direct infrared light through the pupil (to the inner surface of the lens to generate the fourth Purkinje reflection) over a wide range of gaze angles. The ellipsoidal lensing structure also functions to direct the infrared Purkinje reflections to a camera configured to generate a tracking image of the Purkinje reflections. This configuration provides a dual Purkinje eye-tracking system over a wide range of gaze angles that is suitable for incorporation into a head mounted display. These and other embodiments are described in connection with FIGS. 1-7 below.

Figure 1:
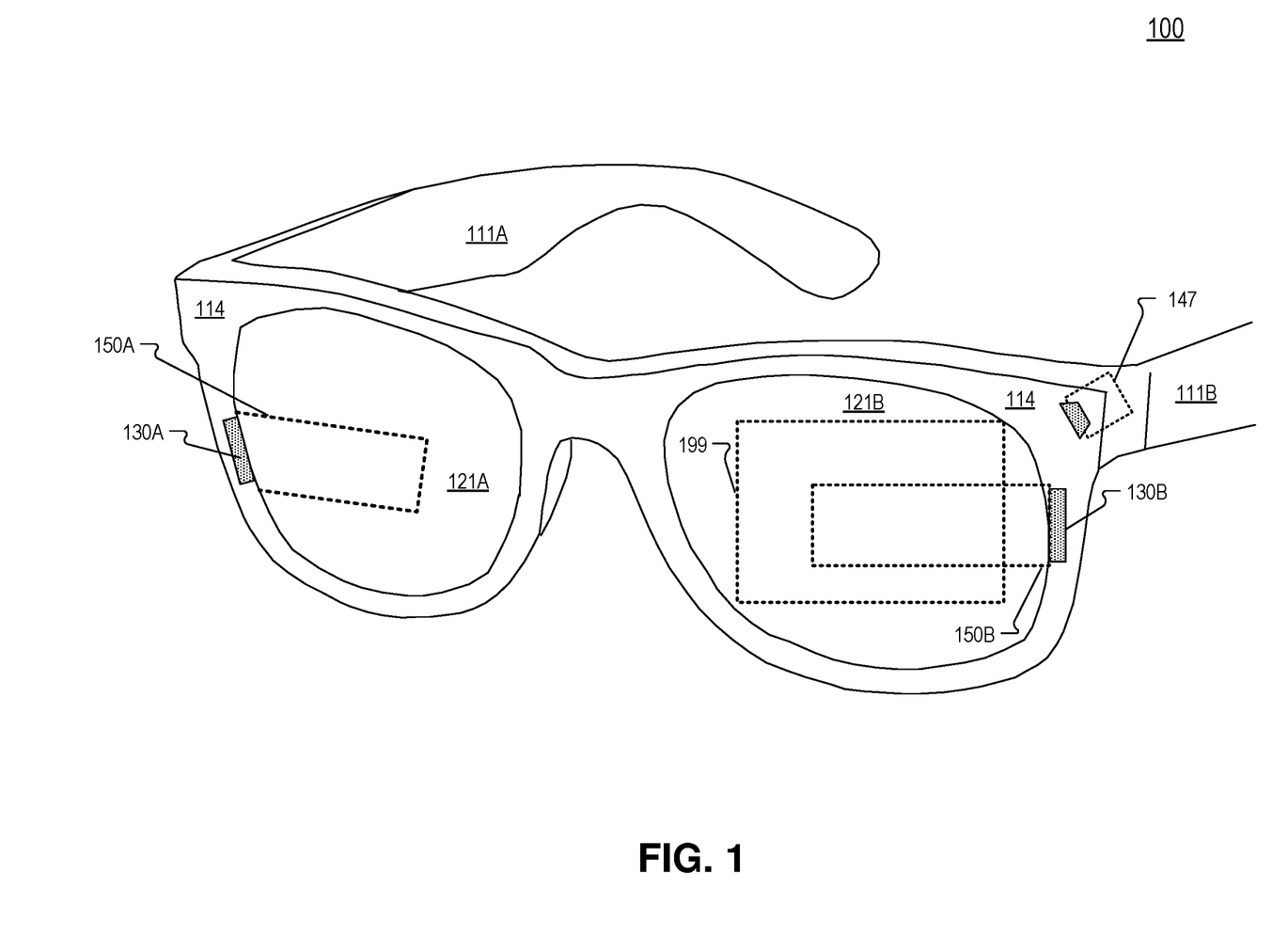
FIG. 1 illustrates an example HMD that may include a combiner for directing light to and from an eye of a user of HMD, in accordance with an embodiment of the disclosure.

FIG. 1 illustrates an example HMD 100 that may include a combiner 199 for directing light to and from an eye of a user of HMD 100, in accordance with an embodiment of the disclosure. Combiner 199 may include an ellipsoidal lensing structure, as will be discussed in more detail below. HMD 100 includes frame 114 coupled to arms 111A and 111B. Lenses 121A and 121B are mounted to frame 114. Lenses 121 may include a prescription matched to a particular wearer of HMD or may be non-prescription lenses. The illustrated HMD 100 is configured to be worn on or about a head of a user of the HMD.

In FIG. 1, each lens 121 includes a waveguide 150 to direct display light generated by a display 130 to an eyebox area for viewing by a wearer of HMD 100. Display 130 may include an LCD, an organic light emitting diode (OLED) display, micro-LED display, quantum dot display, pico-projector, or liquid crystal on silicon (LCOS) display for directing display light to a wearer of HMD 100.

The frame 114 and arms 111 of the HMD 100 may include supporting hardware of HMD 100. HMD 100 may include any of processing logic, wired and/or wireless data interface for sending and receiving data, graphic processors, and one or more memories for storing data and computer-executable instructions. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

Lenses 121 may appear transparent to a user to facilitate augmented reality or mixed reality where a user can view scene light from the environment around her while also receiving display light directed to her eye(s) by waveguide(s) 150. Consequently, lenses 121 may be considered (or include) an optical combiner. In some embodiments, display light is only directed into one eye of the wearer of HMD 100. In an embodiment, both displays 130A and 130B are included to direct display light into waveguides 150A and 150B, respectively.

Eye-tracking module 147 may gather eye-tracking data of an eye of the user to determine an eye-position of the eye of the user. In one embodiment, eye-tracking module 147 includes a camera configured to capture infrared images of the eye. The camera may be configured to only capture images of infrared light corresponding to an infrared wavelength of infrared emitters (not illustrated) of HMD 100 that illuminate the eye of the user. Eye-tracking module 147 may be mounted on the inside of the temple of HMD 100. Although eye-tracking module 147 and combiner 199 are illustrated on only one side of HMD 100, they of course may be duplicated on the other side of HMD 100.

Figure 2A:
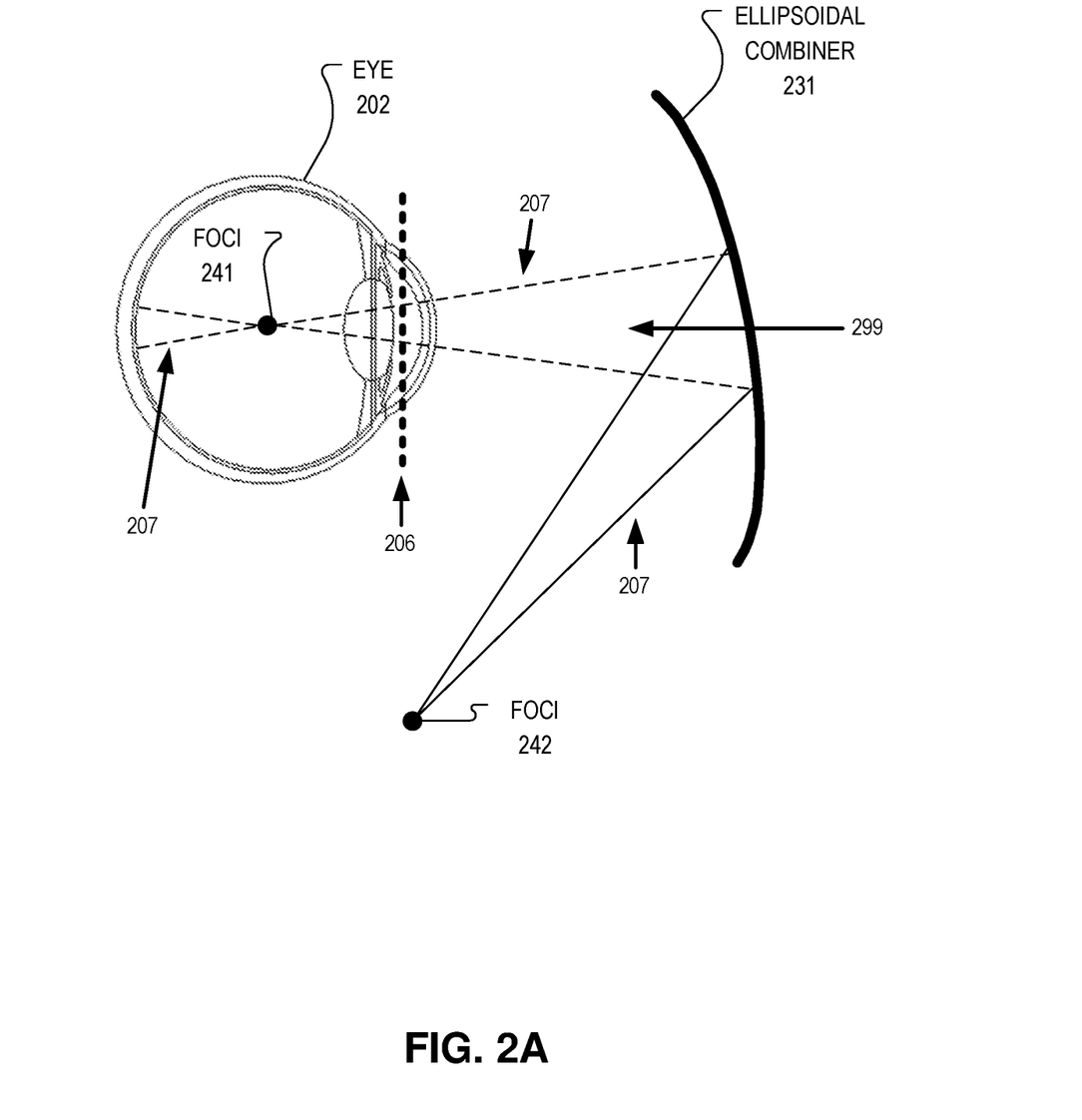
FIGS. 2A-2C illustrate an eye in different positions with respect to an ellipsoidal combiner having an ellipsoidal curvature, in accordance with an embodiment.

FIG. 2A illustrates an ellipsoidal combiner 231 having an ellipsoidal curvature, in accordance with an embodiment of the disclosure. The ellipsoidal curvature of ellipsoidal combiner 231 may follow a three-dimensional curvature defined by a mathematical ellipsoidal equation. In a Cartesian coordinate system, an ellipsoid may be described by:

$$\frac{x^2}{a^2} + \frac{y^2}{b^2} + \frac{z^2}{c^2} = 1 \quad \text{(Equation 1)}$$

where a, b, and c are positive real numbers. Ellipsoidal combiner 231 includes a portion of a full ellipsoid surface. Ellipsoidal combiner 231 may include an infrared reflecting layer disposed on an ellipsoidal curvature so that infrared light encountering the infrared reflecting layer is reflected by the ellipsoidal combiner while visible light is passed. In the context of an HMD, this allows display light or scene light 299 to pass through the infrared reflecting layer (a.k.a. "hot mirror") so that the user of the HMD can view display light or scene light of the external environment. The ellipsoidal combiner 231 is positioned to have a first foci 241 that is at approximately a center of rotation of eye 202. Consequently, light 207 illuminating the ellipsoidal curvature from a second foci 242 of the ellipsoidal combiner 231 will be focused to foci 241 at the center of rotation of eye 202. FIG. 2A illustrates that light 207 propagates through the cornea, anterior chamber, pupil, and lens of the eye 202. At least a portion of the illustrated light 207 propagates substantially normal to a two-dimensional pupil plane 206 defined by the pupil of the eye 202.

Figure 2B:
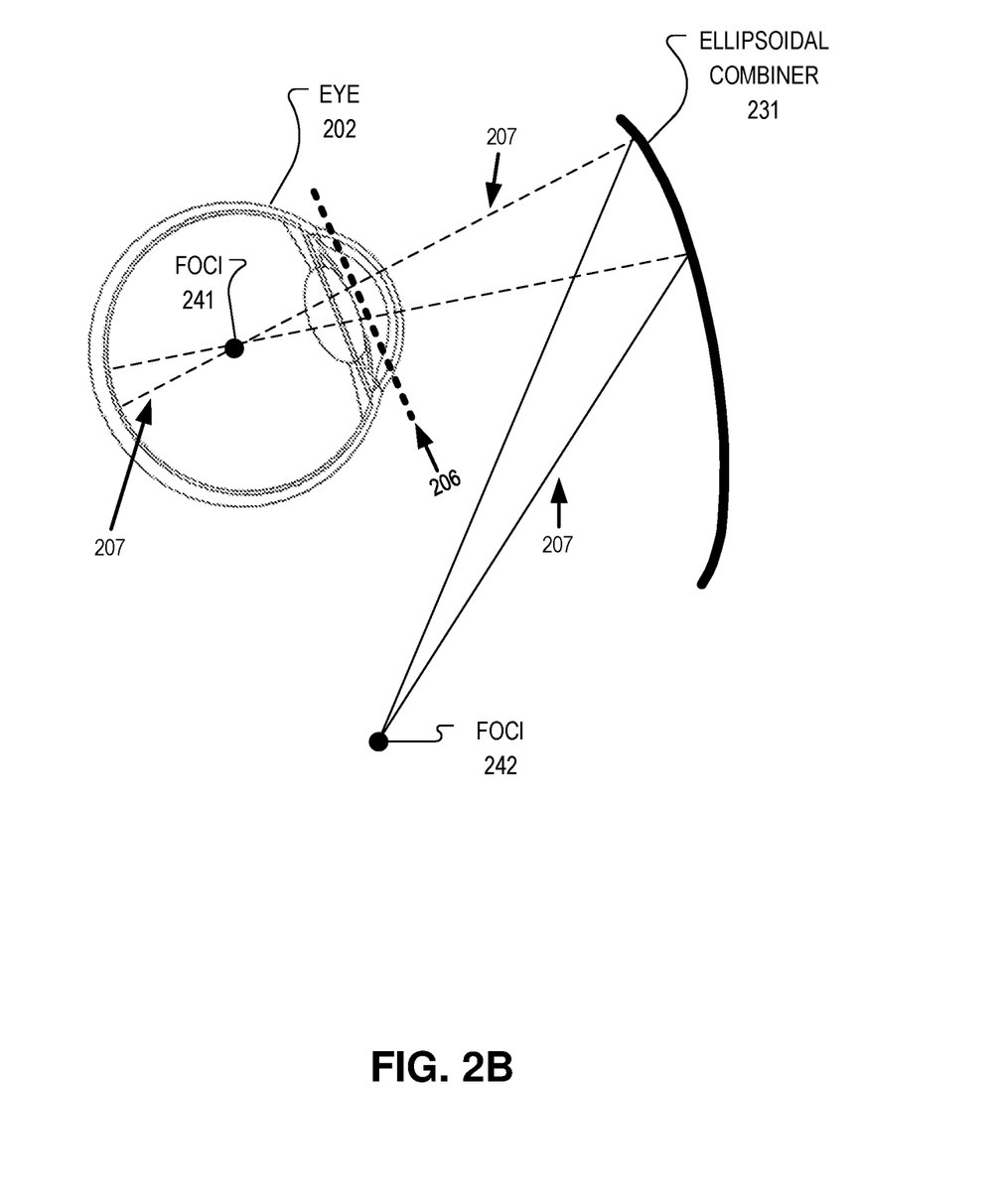

FIG. 2B illustrates ellipsoidal combiner 231 focusing light 207 emitted from second foci 242 to the first foci 241 at the center of rotation of eye 202 when eye 202 has changed a gaze angle of the eye, in accordance with an embodiment of the disclosure. Therefore, a light source positioned at second foci 242 may illuminate a different portion of ellipsoidal combiner 231 when eye 202 rotates and still focus the light 207 to the center of rotation of the eye 202 at the first foci 241 of ellipsoidal combiner 231. This ensures that at least a portion of the illustrated light 207 is able to propagate substantially normal to pupil plane 206 and through the pupil to the lens of the eye over a large range of both horizontal and vertical gaze angles. The eye 202 illustrated in FIG. 2B may be gazing up or gazing to the left, for example.

Figure 2C:
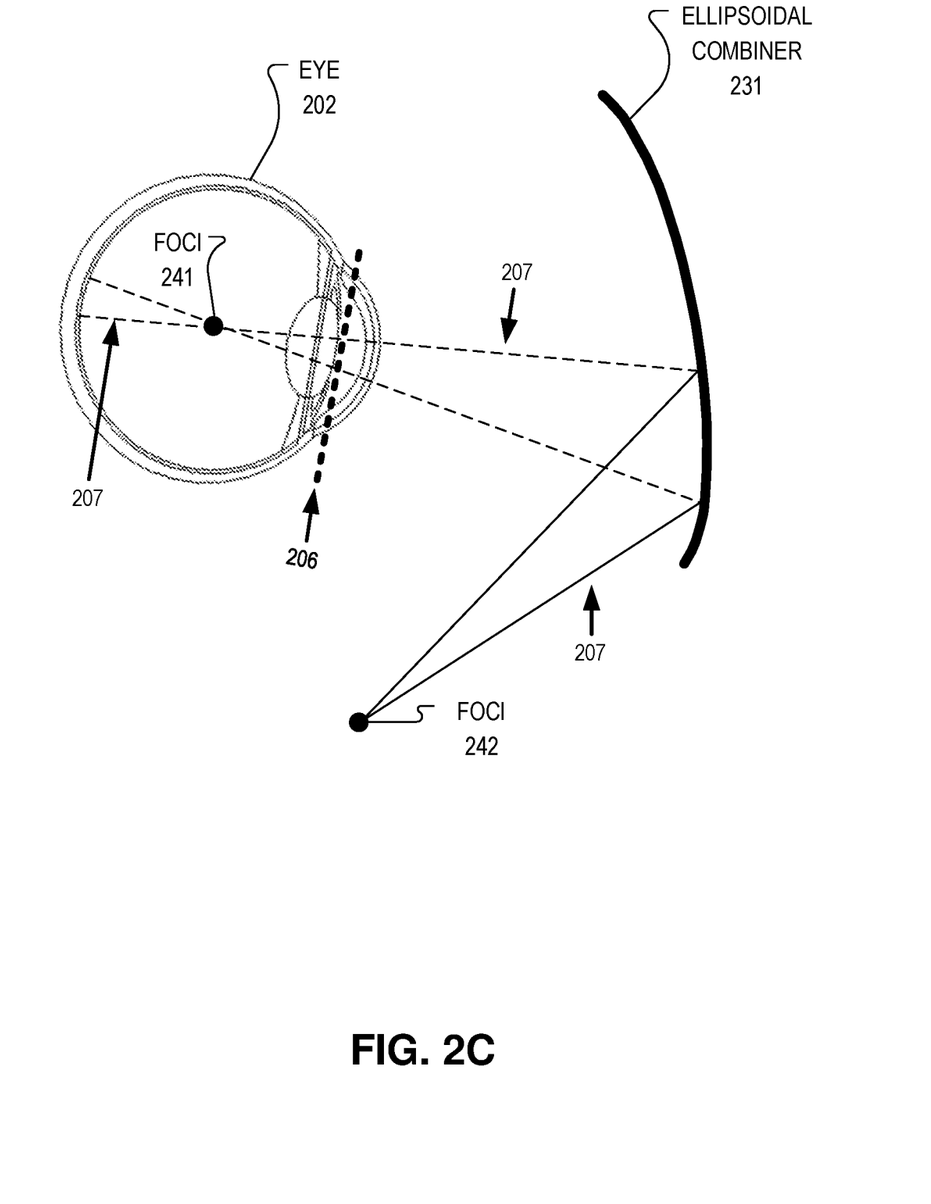

FIG. 2C illustrates ellipsoidal combiner 231 focusing light 207 emitted by second foci 242 to the first foci 241 at the center of rotation of eye 202 when eye 202 is at yet another gaze angle, in accordance with an embodiment of the disclosure. Here again, a light source positioned at second foci 242 may illuminate yet a different portion of ellipsoidal combiner 231 when eye 202 rotates to another gaze angle and still focus the light 207 to the center of rotation of the eye 202 at the first foci 241 of ellipsoidal combiner 231. The eye 202 illustrated in FIG. 2C may be gazing down or gazing to the right, for example. In embodiments of the disclosure, light 207 from second foci 242 may be directed to a particular location of ellipsoidal combiner 231 and redirected by combiner 231 through the pupil to first foci 241 for a range of gaze angles up to 80 degrees horizontal and 80 degrees vertical.

Figure 3A:
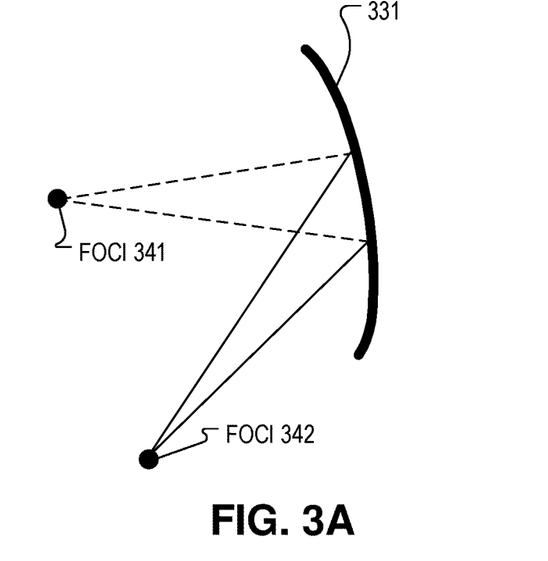
FIGS. 3A-3C illustrate example ellipsoidal lensing structures that may be included in an ellipsoidal combiner, in accordance with an embodiment of the disclosure.
Figure 3B:
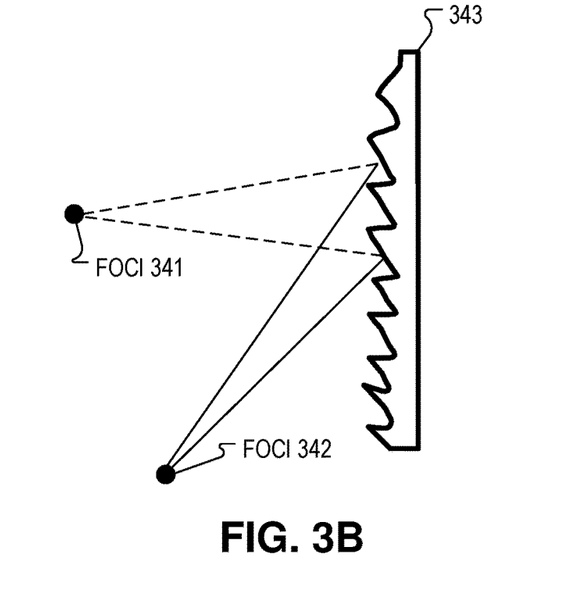
Figure 3C:
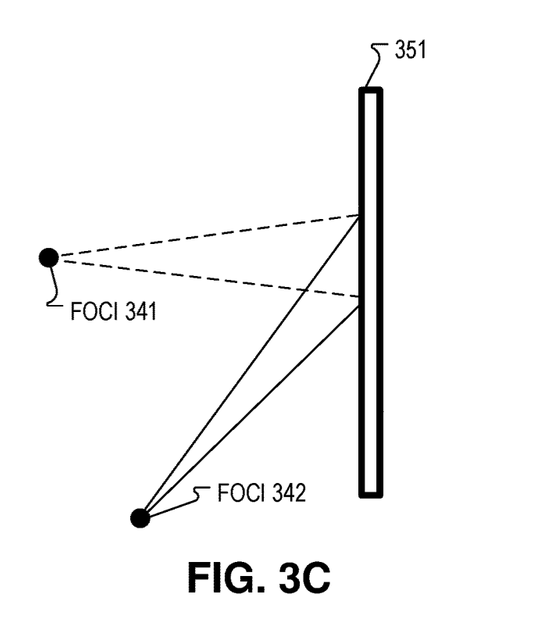

FIGS. 3A-3C illustrate example ellipsoidal lensing structures that may be included in an ellipsoidal combiner such as ellipsoidal combiner 231, in accordance with an embodiment of the disclosure. FIG. 3A illustrates an ellipsoidal lensing structure having a reflecting layer disposed on an ellipsoidal curvature 331. The reflecting layer may be partially reflective (e.g. a beam splitter layer) or be selectively reflective to a particular wavelength or polarization orientation of light to focus light received from second foci 342 to first foci 341. In one embodiment, the reflecting layer is configured to reflect a narrow wavelength band of infrared light centered around 850 nm. In one embodiment, the reflecting layer is configured to pass a first polarization orientation (e.g. s-polarized light) while reflecting a second polarization orientation (e.g. p-polarized light). Including a partially reflective or selectively reflective reflecting layer may allow a combiner to reflect light having particular attributes (e.g. infrared wavelength) and pass display light or scene light 299 to the eye of a user.

FIG. 3B illustrates an ellipsoidal Fresnel structure 343 as an example ellipsoidal lensing structure, in accordance with an embodiment of the disclosure. Ellipsoidal Fresnel structure 343 may be an ellipsoidal optical surface decomposed into its Fresnel form having Fresnel facets disposed along a common plane. Hence, ellipsoidal Fresnel structure 343 may function as an ellipsoidal curvature that reflects and focuses light received from second foci 342 to first foci 341, similar to ellipsoidal curvature 331. The partially reflective or selectively reflective layer described in connection with FIG. 3A may be disposed on the ellipsoidal Fresnel structure 343.

FIG. 3C illustrates a diffractive or holographic ellipsoidal structure 351 as an example ellipsoidal lensing structure, in accordance with an embodiment of the disclosure. Diffractive ellipsoidal structure 351 may include a reflective surface relief or volume Bragg grating or a holographically recorded ellipsoidal surface that focuses light received from second foci 342 to first foci 341 and is functionally similar to ellipsoidal curvature 331. Since the embodiments illustrated in FIGS. 3B and 3C may be fabricated in a plane, these embodiments may favorably decrease the form factor of the ellipsoidal lensing structure that is selected for a combiner to be included into a lens of a head mounted display.

Figure 4A:
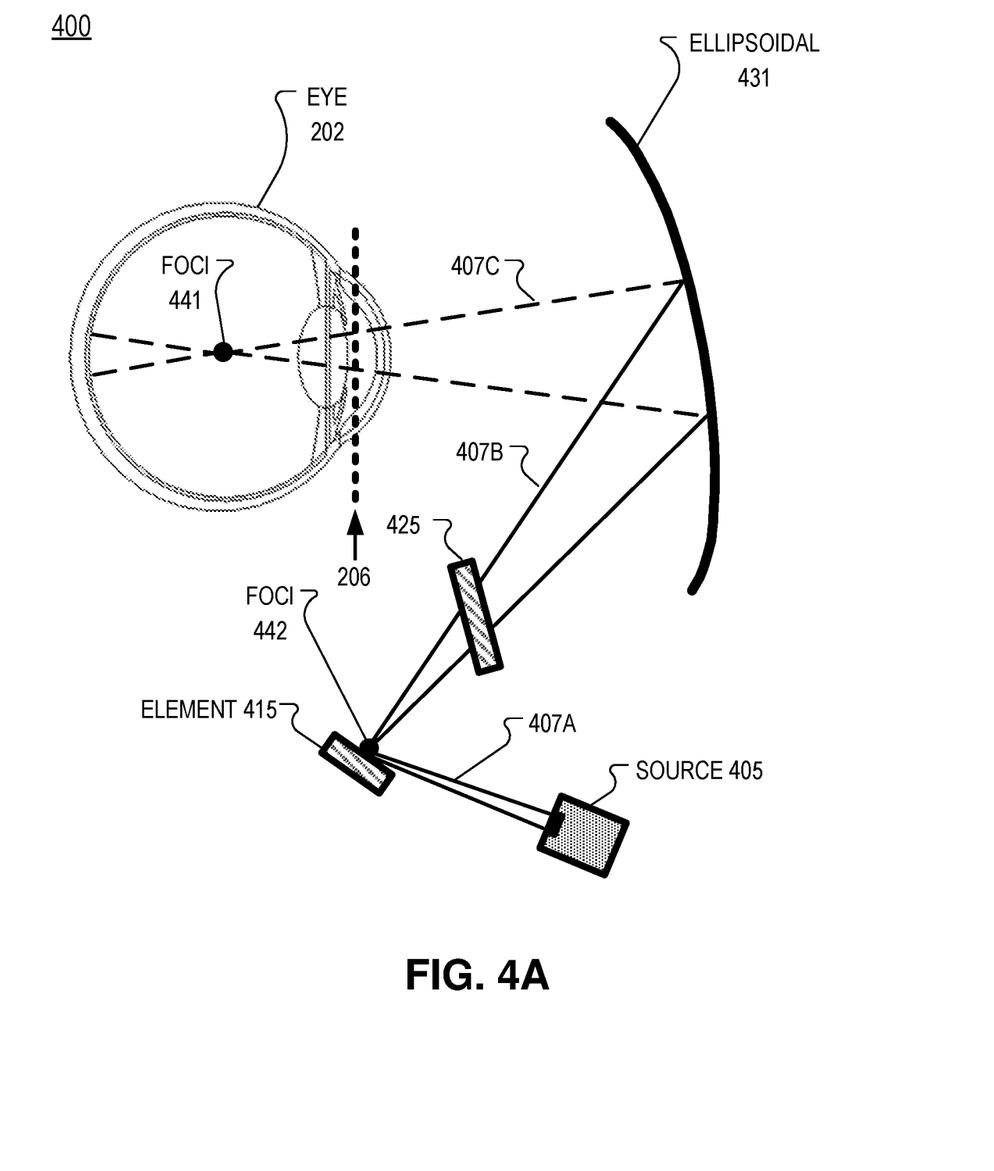
FIGS. 4A-4C illustrate a Purkinje imaging system including an ellipsoidal lensing structure, in accordance with an embodiment of the disclosure.
Figure 4B:
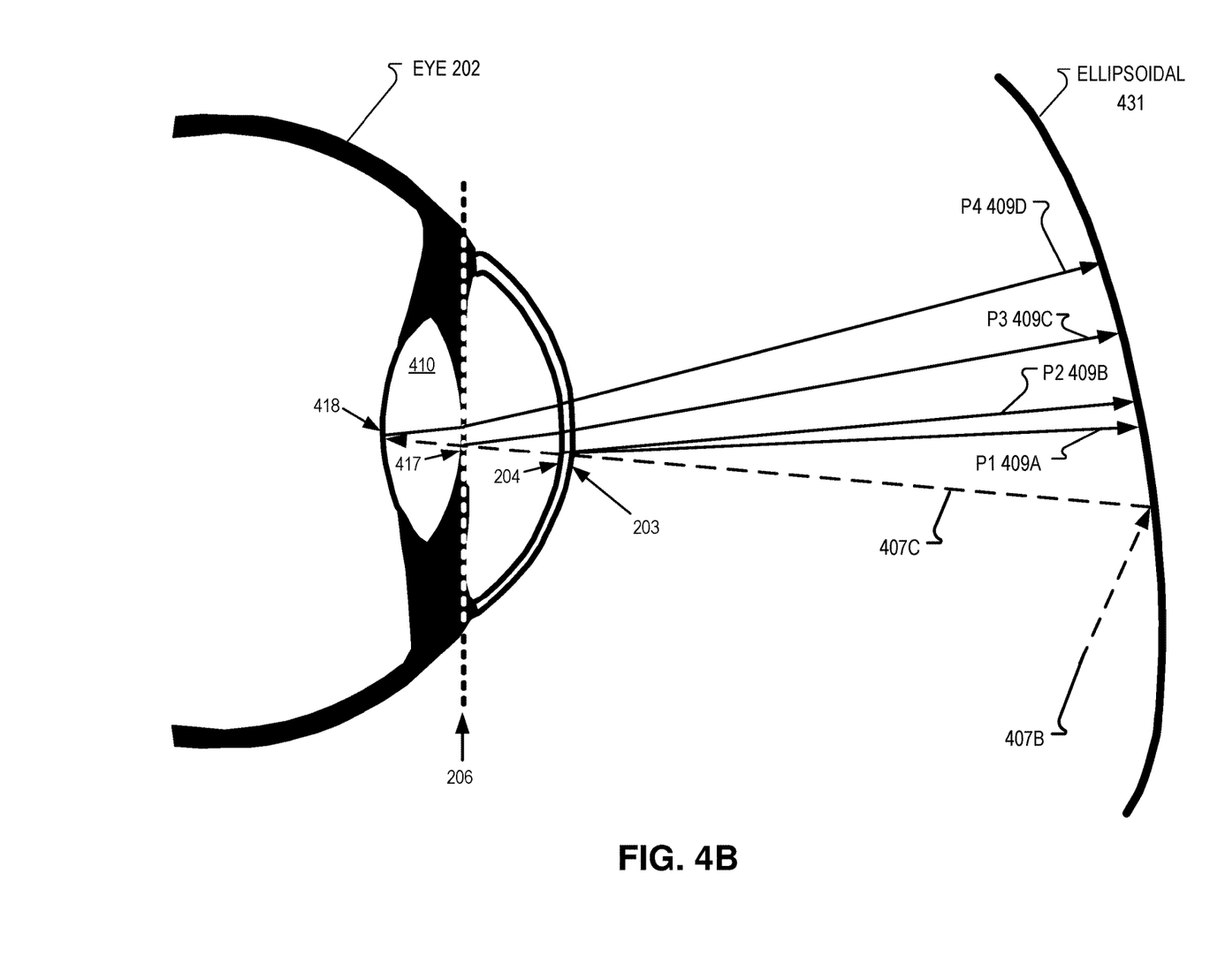
Figure 4C:
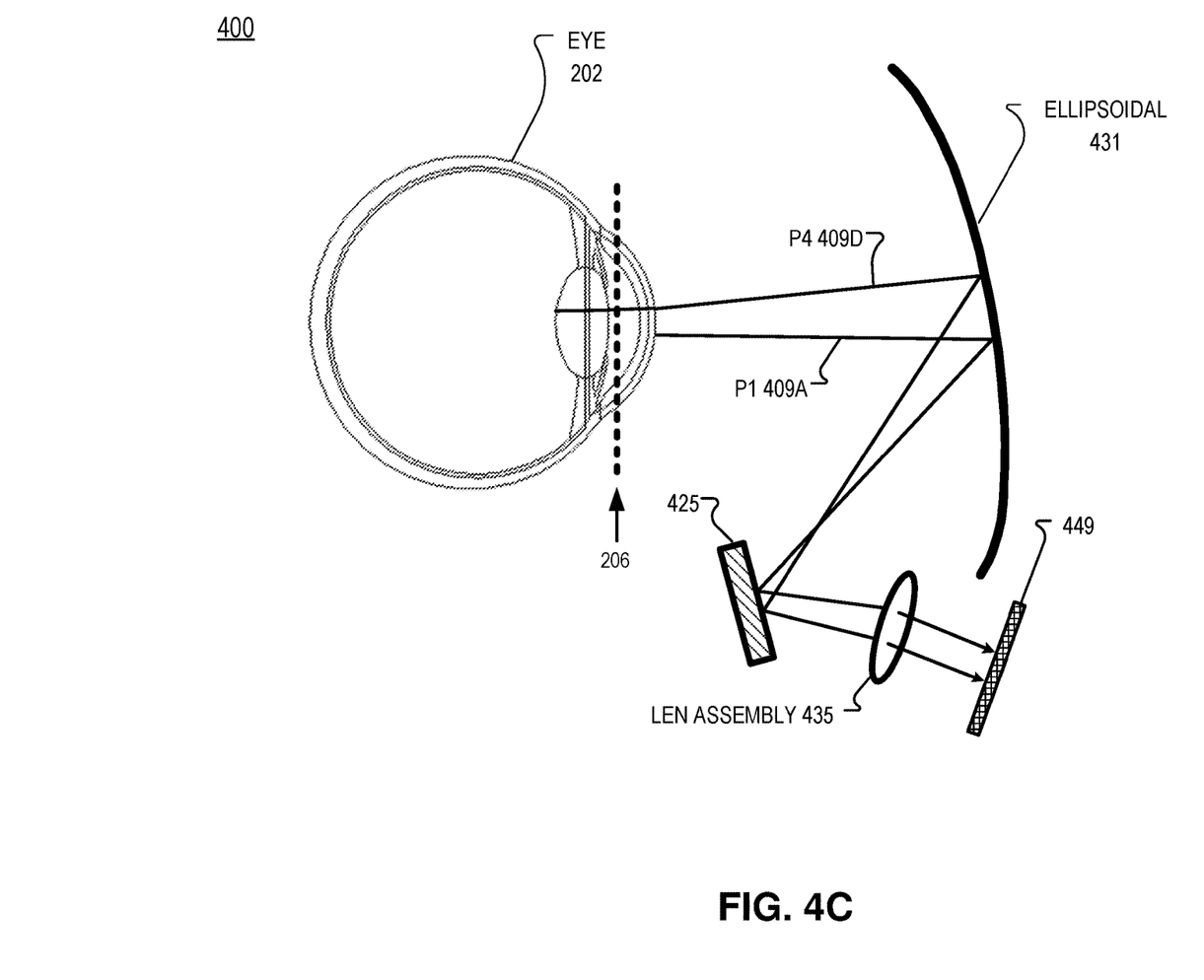

FIGS. 4A-4C illustrate a Purkinje imaging system 400 including an ellipsoidal lensing structure, in accordance with an embodiment of the disclosure. FIG. 4A illustrates an illumination portion of system 400. In FIG. 4A, an infrared light source 405 emits infrared illumination light 407A. Infrared light source 405 may include an LED or a laser diode. Infrared illumination light 407A may be collimated infrared light. Light source 405 may be disposed at a second foci 442 of ellipsoidal combiner 431. Beam-steering element 415 is configured to selectively redirect the infrared illumination light 407A to ellipsoidal combiner 431 as infrared illumination light 407B. Near-eye ellipsoidal combiner 431 may include any of the ellipsoidal lensing structures 331, 343, or 351. The infrared illumination light 407B that is directed to ellipsoidal combiner 431 may encounter a beam splitter element 425 before encountering ellipsoidal combiner 431. Beam splitter element 425 may pass a portion (e.g. 50%) of infrared illumination light 407B to ellipsoidal combiner 431 while reflecting the remaining portion (e.g. 50%). Ellipsoidal combiner 431 is configured to redirect infrared illumination light 407B to an eyebox location where eye 202 may be positioned. The first foci of the ellipsoidal lensing structure may be located at approximately a center of rotation of the eye placed in the eyebox location.

Ellipsoidal combiner 431 is to be positioned such that the first foci 441 of the ellipsoidal combiner 431 is at a center of rotation of eye 202. Beam-steering element 415 may be located at a second foci 442 of ellipsoidal combiner 431. Beam-steering element 415 may be a digital micromirror device (DMD) that adjusts a position of a mirror to direct infrared illumination light 407A to different locations of the ellipsoidal combiner 431. For example, the beam-steering element 415 may be driven to direct infrared illumination light 407B to different positions on ellipsoidal combiner 431 in response to eye-tracking data that includes a position of eye 202. In some embodiments, the DMD includes a curved mirror that acts as a collimator of received infrared illumination light 407A so that infrared illumination light 407B directed toward ellipsoidal combiner 431 is collimated or near-collimated. In another embodiment, a scanning fiber module is used to steer a fiber that carries the infrared illumination light 407A emitted by an infrared light source included in the scanning fiber module. The scanning fiber module may include a one or more piezo-electric actuators that are coupled to move the fiber. The fiber of the scanning fiber module may be moved at a high rate to illuminate different locations of the ellipsoidal combiner 431. The infrared illumination light 407B emitted by the fiber scanning module may be collimated or near-collimated. The output of the fiber may be at the second foci 442 of ellipsoidal combiner 431.

The ellipsoidal combiner 431 redirects infrared illumination light 407B as infrared illumination light 407C. FIG. 4B illustrates a zoomed in view of eye 202, ellipsoidal combiner 431, and Purkinje reflections of eye 202, in accordance with an embodiment of the disclosure. Portions of infrared illumination light 407C (not illustrated) may not necessarily propagate through the pupil and may be scattered by the iris or cornea. However, at least a portion of infrared illumination light 407C propagates substantially normal to pupil plane 206 of eye 202. Infrared illumination light 407C is not illustrated as normal to pupil plane 206 in FIG. 4B to more easily illustrate the four separate Purkinje reflections P1, P2, P3, and P4, although the four Purkinje reflections will also be generated for infrared illumination light 407C propagating substantially normal to pupil plane 206.

In the illustrated embodiment of FIG. 4B, infrared illumination light 407C encounters the outer surface 203 of the cornea of eye 202 and at least a portion of infrared illumination light 407C reflects back toward ellipsoidal combiner 431 as first Purkinje reflection P1 409A. The portion of infrared illumination light 407C that is not reflected by cornea outer surface 203 encounters cornea inner surface 204 and at least a portion of infrared illumination light 407C reflects back toward ellipsoidal combiner 431 as second Purkinje reflection P2 409B. The portion of infrared illumination light 407C that is not reflected by cornea inner surface 204 propagates through the anterior chamber, through the pupil, and encounters the outer surface 417 of lens 410 of eye 202. At least a portion of infrared illumination light 407C that encounters outer surface 417 of the lens 410 reflects back toward ellipsoidal combiner 431 as third Purkinje reflection P3 409C. The portion of infrared illumination light 407C that is not reflected by lens outer surface 417 propagates through lens 410 and encounters the inner surface 418 of lens 410 of eye 202. At least a portion of infrared illumination light 407C that encounters inner surface 418 of the lens 410 reflects back toward ellipsoidal combiner 431 as fourth Purkinje reflection P4 409D.

Ellipsoidal combiner 431 receives Purkinje reflections P1 409A, P2 409B, P3 409C, and P4 409D and reflects them toward beam splitter 425 (reflections not illustrated). FIG. 4C illustrates first Purkinje reflection P1 409A and fourth Purkinje reflection P4 409D reflected by near-eye ellipsoidal combiner 431 to an image sensor 449 of a camera via beam splitter 425. The image sensor captures a tracking image of the Purkinje reflections. The position of the first Purkinje reflection P1 409A and the fourth Purkinje reflection 409D relative to eye 202 can be utilized to track a position of the eye 202 over a variety of gaze angles.

Figure 6:
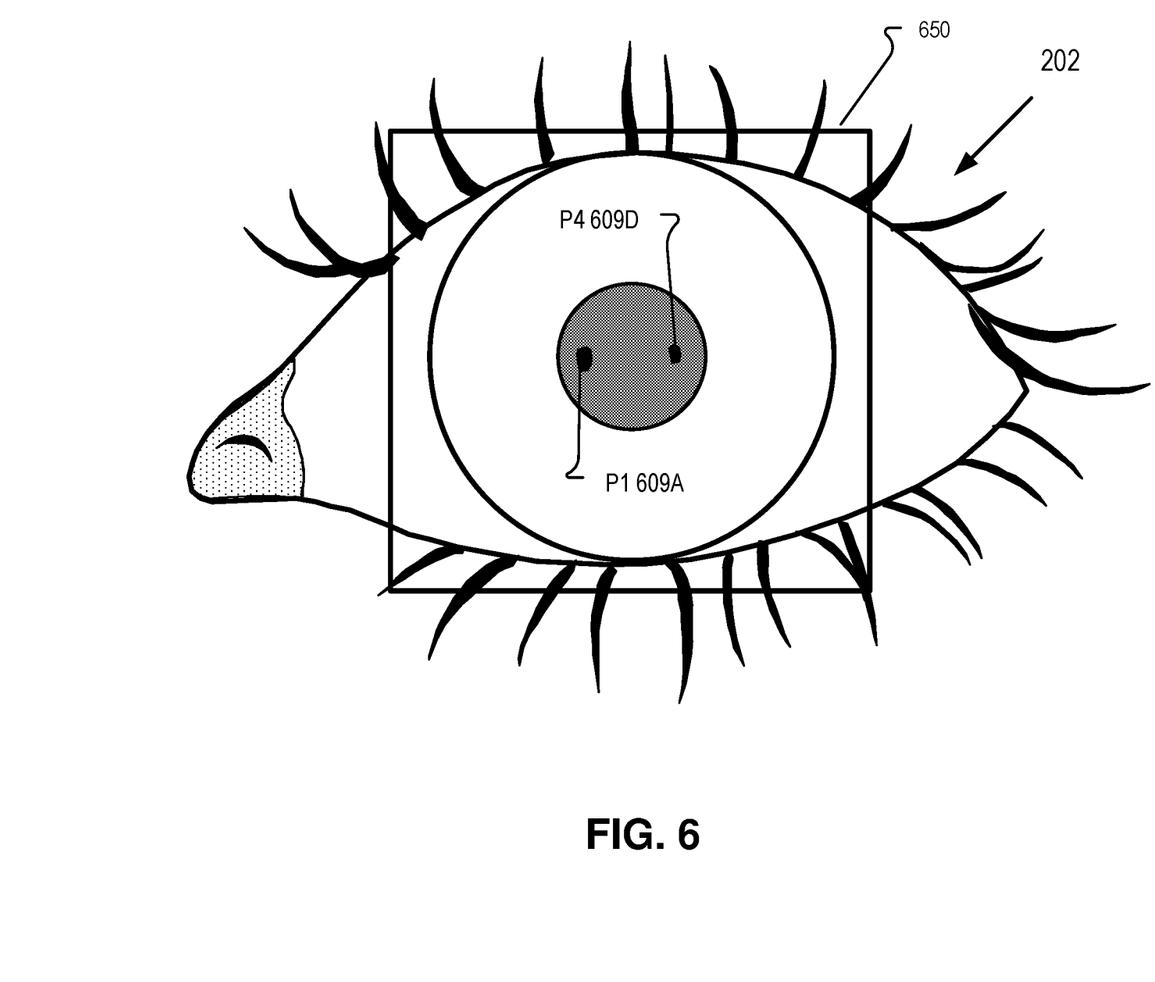
FIG. 6 illustrates an example Purkinje image of an eye, in accordance with an embodiment of the disclosure.

FIG. 6 illustrates an example tracking image 650 that includes a portion of an eye 202, in accordance with an embodiment of the disclosure. First Purkinje spot P1 609A is generated by the first Purkinje reflection P1 409A and fourth Purkinje spot P4 609D is generated by the fourth Purkinje reflection P4 409D. The distance between the first Purkinje spot P1 609A and fourth Purkinje spot P4 609D changes proportionally with the angle of rotation of the eye. Therefore, using conventional Purkinje tracking methods, the translation of the eye and the rotation of the eye can be determined from the tracking image(s) that include the first Purkinje spot P1 609A and fourth Purkinje spot P4 609D.

Returning to FIG. 4C, the illustrated embodiment includes a lens assembly 435 to focus the Purkinje reflections P1 409A and P4 409D to image sensor 449. Lens assembly 435 is disposed between image sensor 449 and beam splitter 425 in FIG. 4C. In some embodiments, system 400 may include processing logic (not illustrated) that is configured to select a scanning position of beam-steering element 415 and also configured to initiate an image capture of image sensor 449. The scanning position of beam-steering element 415 may change based on eye position data received in eye-tracking data. The eye-tracking data may be received from an eye-tracking module or generated from prior tracking images that include Purkinje reflections.

Figure 5:
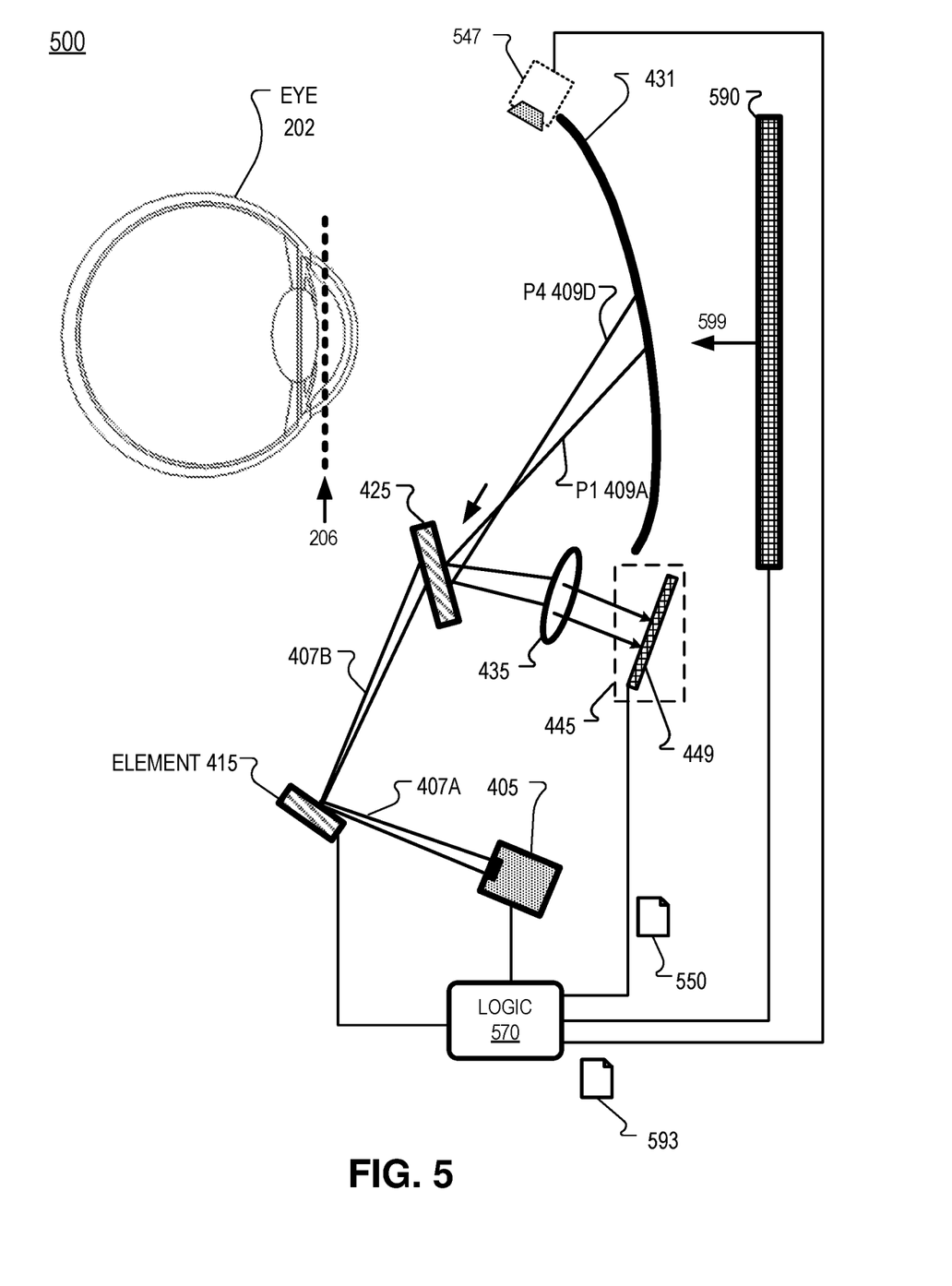
FIG. 5 illustrates a Purkinje imaging system that may be utilized in an HMD, in accordance with an embodiment of the disclosure.

FIG. 5 illustrates a Purkinje imaging system 500 that may be utilized in an HMD, in accordance with an embodiment of the disclosure. Purkinje imaging system 500 may optionally include an eye-tracking module 547 for determining a position of eye 202. In some embodiments, eye-tracking module 547 includes a camera configured to capture infrared images of eye 202. Eye-tracking module 547 may be configured similarly to eye-tracking module 147. Eye-tracking module 547 generates eye-tracking data 593 that may include a position of eye 202. For example, eye 202 may change gaze angles in any combination of up, down, right, and left, and eye-tracking module 547 may provide those gaze angles in eye-tracking data 593 by analyzing images of eye 202. In other embodiments, eye-tracking data including a position of eye 202 is generated by analyzing tracking images 550 captured by a camera 445 that includes image sensor 449. Image sensor 449 may be disposed in an image capture plane that is conjugate to the pupil plane 206 of the eye 202 placed in the eyebox location. As discussed above, the spacing of Purkinje reflections can be analyzed to determine eye position and gaze angle using known image processing techniques.

Display 590 generates visible display light 599 for presenting a virtual image to a user of an HMD. Visible display light 599 may propagate through ellipsoidal combiner 431 with very little (if any) optical loss since ellipsoidal combiner 431 is configured to pass visible light and reflect a particular bandwidth of infrared light emitted by light source 405. Display 590 may include an OLED, micro-LED, or LCD in a virtual reality context. In an augmented reality or mixed reality context, display 590 may include a transparent OLED or an LCOS projector paired with a waveguide included in a lens of an HMD, for example.

In FIG. 5, processing logic 570 is configured to control display 590 and drive images onto display 590. Processing logic 570 is also configured to receive eye-tracking data 593 generated by eye-tracking module 547. Optionally, processing logic 570 is configured to control the intensity of infrared illumination light 407A emitted by light source 405. Processing logic 570 is further configured to select a scanning position of beam-steering element 415 and configured to initiate an image capture of image sensor 445 as well as receiving tracking image 550 from image sensor 449. Processing logic 570 may be configured to determine an eye position of the eye 202 in response to receiving tracking image 550 and adjust virtual images presented to a user in response to other determined eye positions.

FIG. 5 shows that first Purkinje reflection P1 409A and fourth Purkinje reflection P4 409D are directed to image sensor 449 via beam splitting element 425 and lens assembly 435. Although the optical paths associated with infrared illumination light 407C and the Purkinje reflections directed to near-eye optical combiner 431 are not illustrated in FIG. 5, they may follow the optical paths illustrated in FIGS. 4A-4C.

Figure 7:
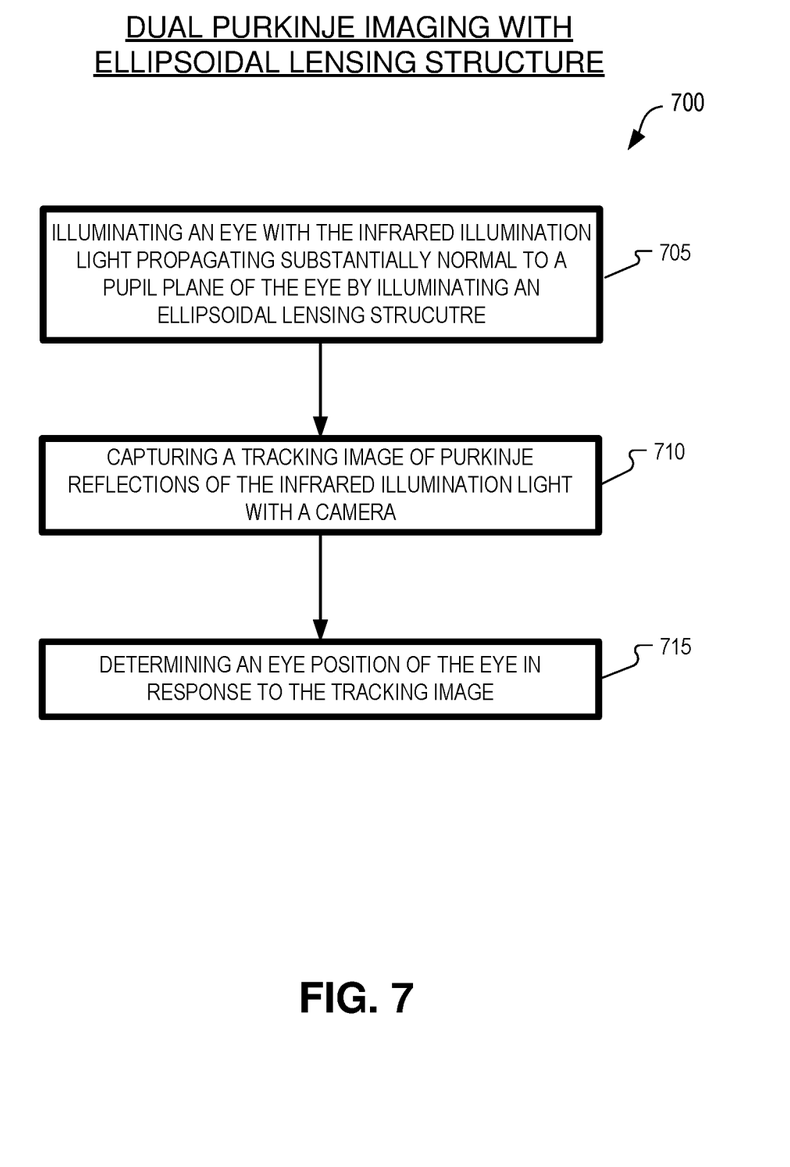
FIG. 7 illustrates a flow chart for a process of generating a Purkinje image with an ellipsoidal lensing structure, in accordance with an embodiment of the disclosure.

FIG. 7 illustrates a flow chart for a process 700 of generating a Purkinje image with an ellipsoidal lensing structure, in accordance with an embodiment of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel. In some embodiments, all or a portion of the process blocks associated with process 700 are executed by processing logic 570 of FIG. 5.

In process block 705, an eye is illuminated by infrared illumination light (e.g. infrared illumination light 407A) that propagates substantially normal to a pupil plane (e.g. 206) of the eye. Illuminating the eye includes illuminating a near-eye ellipsoidal lensing structure (e.g. ellipsoidal lensing structure 331, 343, or 351). In an embodiment, the near-eye ellipsoidal lensing structure is included in an optical combiner that passes visible light to the eye. The near-eye ellipsoidal lensing structure may be configured to have a first foci approximately at a center of rotation of the eye. The infrared illumination light illuminating the ellipsoidal lensing structure may be collimated or near-collimated. The infrared illumination light may be generated by an infrared light source (e.g. light source 405). The infrared illumination light may be directed to the ellipsoidal lensing structure from a second foci of the ellipsoidal lensing structure. The infrared illumination light may have a wavelength of 850 nm or 940 nm, for example. Processing logic 570 may activate the infrared light source (e.g. light source 405) in some embodiments.

In some embodiments, illuminating the eye includes scanning a beam-steering element to a selected scan position and the beam-steering element directs the infrared illumination light to the near-eye ellipsoidal lensing structure. Process 700 may further include receiving eye-tracking data that includes a position of the eye and the scan position may be selected in response to the eye-tracking data. For example, the scan position of the beam-steering element may be selected so that at least a portion of the infrared illumination light is propagating through the pupil of the eye approximately normal to a pupil plane of the eye.

In process block 710, a tracking image (e.g. 550) of Purkinje reflections of the infrared illumination light is captured with a camera. The ellipsoidal lensing structure redirects the Purkinje reflections to the camera (e.g. 445) that generates the tracking image. The camera may be disposed in an image capture plane that is conjugate to the pupil plane of the eye. The Purkinje reflections may be focused to the camera by a lens or lens assembly. The Purkinje reflections may include a first Purkinje reflection and a fourth Purkinje reflection.

In process block 715, an eye position of the eye is determined in response to the tracking image. In some embodiments of process 700, a virtual image presented to a user of an HMD is adjusted in response to the determined eye position. The visible light of the virtual image may propagate through the near-eye ellipsoidal lensing structure to the eye. Adjusting the virtual image may include applying blurring filters to provide focusing cues for the user or moving virtual objects in the virtual image, for example. In an example, the determined eye position is used to identify a virtual object in a virtual image that the user is focused on. Portions of the virtual image that are not at the same focus distance as the virtual object the user is gazing toward may be blurred to enhance the user's ability to focus on the virtual object indicated by the eye position, for example.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. 570) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of operating an augmented reality headset comprising:
   illuminating an eye with infrared illumination light propagating substantially normal to a pupil plane of the eye by scanning a beam-steering element to a scan position that is selected based on eye tracking data, wherein illuminating the eye includes illuminating a near-eye ellipsoidal lensing structure configured to have a first foci at a center of rotation of the eye, wherein illuminating the near-eye ellipsoidal lensing structure includes directing, from a second foci of the near-eye ellipsoidal lensing structure, the infrared illumination light to the near-eye ellipsoidal lensing structure, wherein the near-eye ellipsoidal lensing structure is included in an optical combiner configured to pass scene light and configured to reflect the infrared illumination light;
   capturing a tracking image of Purkinje reflections of the infrared illumination light with a camera, wherein the Purkinje reflections of the infrared illumination light are directed to the camera by the near-eye ellipsoidal lensing structure;
   determining a distance between a first of the Purkinje reflections and a fourth of the Purkinje reflections within the tracking image; and
   determining an update to an eye position of the eye in response to the tracking image and at least partially based on the distance.

2. The method of claim 1, wherein the camera is disposed in an image capture plane that is conjugate to the pupil plane of the eye.

3. The method of claim 2, wherein the Purkinje reflections of the infrared illumination light are focused to the camera by a lens.

4. The method of claim 1, wherein the beam-steering element directs the infrared illumination light to the near-eye ellipsoidal lensing structure.

5. The method of claim 4, further comprising:
   receiving eye-tracking data that includes the eye position of the eye, wherein the scan position is selected in response to the eye-tracking data.

6. The method of claim 1 further comprising:
   adjusting a virtual image presented to a user of the augmented reality headset in response to the determined eye position, wherein visible image light of the virtual image propagates through the near-eye ellipsoidal lensing structure to the eye.

7. The method of claim 1, wherein the infrared illumination light illuminating the near-eye ellipsoidal lensing structure is collimated or near-collimated.

8. The method of claim 1, wherein the infrared illumination light propagates through a beam splitter prior to encountering the near-eye ellipsoidal lensing structure, and wherein the Purkinje reflections are directed to the camera by the beam splitter.

9. A method of operating an augmented reality headset comprising:
   receiving eye-tracking data that includes a position of an eye;
   selecting a scan position in response to the eye-tracking data;
   illuminating the eye with infrared illumination light propagating substantially normal to a pupil plane of the eye by scanning a beam-steering element to the selected scan position, wherein illuminating the eye includes illuminating a near-eye ellipsoidal lensing structure, and wherein the beam-steering element directs the infrared illumination light to the near-eye ellipsoidal lensing structure, wherein the near-eye ellipsoidal lensing structure is included in an optical combiner configured to pass scene light and configured to reflect the infrared illumination light;
   capturing a tracking image of Purkinje reflections of the infrared illumination light with a camera, wherein the Purkinje reflections of the infrared illumination light are directed to the camera by the near-eye ellipsoidal lensing structure;
   determining a distance between a first of the Purkinje reflections and a fourth of the Purkinje reflections within the tracking image; and
   determining an update to the position of the eye in response to the tracking image and at least partially based on the distance.

10. A method of operating an augmented reality headset comprising:
- illuminating an eye with infrared illumination light propagating substantially normal to a pupil plane of the eye by scanning a beam-steering element to a scan position that is selected based on eye tracking data, wherein illuminating the eye includes illuminating a near-eye ellipsoidal lensing structure, wherein the near-eye ellipsoidal lensing structure is included in an optical combiner configured to pass scene light and configured to reflect the infrared illumination light;
- capturing a tracking image of Purkinje reflections of the infrared illumination light with a camera, wherein the Purkinje reflections of the infrared illumination light are directed to the camera by the near-eye ellipsoidal lensing structure;
- determining a distance between a first of the Purkinje reflections and a fourth of the Purkinje reflections within the tracking image;
- determining an update to an eye position of the eye in response to the tracking image and at least partially based on the distance; and
- adjusting a virtual image presented to a user of the augmented reality headset in response to the determined eye position, wherein visible image light of the virtual image propagates through the near-eye ellipsoidal lensing structure to the eye.

* * * * *